United States Patent [19]

Umegawa

[11] Patent Number: 4,575,107
[45] Date of Patent: Mar. 11, 1986

[54] PISTON RINGS FOR INTERNAL COMBUSTION ENGINE

[75] Inventor: Koujiro Umegawa, Kashiwazaki, Japan

[73] Assignees: Kabushiki Kaisha Riken; Honda Giken Kogyo Kabushiki Kaisha, both of Tokyo, Japan

[21] Appl. No.: 578,433

[22] Filed: Feb. 9, 1984

[30] Foreign Application Priority Data

Feb. 12, 1983 [JP] Japan .............................. 58-19221[U]

[51] Int. Cl.$^4$ .............................................. F16J 9/14
[52] U.S. Cl. .................................... 277/221; 277/222
[58] Field of Search ......................... 277/216, 218–222

[56] References Cited

U.S. PATENT DOCUMENTS 1,397,334 11/1921 Schmolinski .
1,512,393 10/1924 Behnke .
1,930,857 10/1933 Morton .

Primary Examiner—Robert S. Ward
Attorney, Agent, or Firm—Finnegan, Henderson, Farabow, Garrett & Dunner

[57] ABSTRACT

A piston for a reciprocating internal combustion engine includes at least one pressure ring installed in an outer surface of the piston main body adjacent to the piston head. The pressure ring has a double-angle butt end construction comprising an outer circumferential surface slidably contacting the inner circumferential wall of the cylinder, a radially extending first butt flat end face, and a side wall facing the combustion chamber side, namely the high-pressure side, of the engine piston chamber. Only a corner portion formed on the combustion chamber side of the pressure ring by the outer circumferential surface, flat end face and side wall is partially cut away to form a notch which is contiguous to the outer circumferential surface, end face and side wall. The pressure ring further includes a radially extending second butt flat end face opposing the first flat end face, and a rib projecting circumferentially from the second flat end face only at a position corresponding to the notch, the rib having a shape which is complementary to that of the notch for being gas-tightly received by the notch when the pressure ring is installed in an outer circumferential groove of the piston main body.

1 Claim, 6 Drawing Figures

PISTON RINGS FOR INTERNAL COMBUSTION ENGINE

BACKGROUND OF THE INVENTION

This invention relates to a piston for a reciprocating internal combustion engine and, more particularly, to a piston of the type described having an improved piston ring construction.

The standard piston ring in practical use is a combination of three rings, namely a tip ring serving as the pressure ring which is for the purpose of preventing a phenomenon sometimes referred to as "blow-by" wherein high pressure combustion gas from the combustion chamber side of the engine flows out to the crank case side thereof, a second ring and an oil ring which reduces the consumption of oil by suppressing the amount of lubricating oil which flows into the combustion chamber side of the engine from the crank case side.

The combined ring of this standard construction was submitted to tests using a 1500 cc four-cycle engine for the purpose of measuring oil consumption (gr/h) and blow-by (l/min). In the test, referred to hereinafter as Test I, the mean values obtained were 0 gr/h, 17 l/min at 4600 rpm with a full engine load, 10 gr/h, 18 l/min at 5200 rpm with a full engine load, and 50 gr/h, 0 l/min at 2500 rpm with an engine high boost of 650 m/mHg. While oil consumption and blow-by values on this order are tolerable for practical use, it is preferable that these values be reduced to improve upon engine efficiency.

To the foregoing end, various pressure rings used in a combination of three rings have been proposed to exhibit an improved oil tightness characteristic.

However, while improvements in pressure rings have made it possible to diminish blow-by in reciprocating internal combustion engines, the piston arrangements heretofore available have not succeeded in simultaneously reducing oil consumption, as will be described later in a more detailed discussion of the prior art.

SUMMARY OF THE INVENTION

An object of the present invention is to provide a piston, for use in a reciprocating internal combustion engine, having an improved ring construction capable of reducing both blow-by and oil consumption.

According to the present invention, the foregoing object is attained by providing a piston comprising a piston main body having a piston head, a pressure ring installed in a ring groove formed on an outer surface of the piston main body adjacent to the piston head, and an oil ring installed in a ring groove formed on the outer surface of the piston main body below the pressure ring. The pressure ring has a double-angle butt end construction comprising an outer circumferential surface contacting the inner circumferential wall of the piston chamber, a radially extending first butt flat end face, and a side wall facing the combustion chamber side, namely the high-pressure side, of the engine piston chamber. Only a corner portion formed on the combustion chamber side of the pressure ring by the outer circumferential surface, flat end face and side wall is partially cut away to form a notch which is contiguous to the outer circumferential surface, flat end face and side wall. The pressure ring further includes a radially extending second butt flat end face opposing the first flat end face, and a rib projecting circumferentially from the second end flat face only at a position corresponding to the notch, the rib having a shape which is complementary to that of the notch for being received by the notch when the pressure ring is installed in an outer circumferential groove of the piston main body.

BRIEF DESCRIPTION OF THE DRAWINGS

The drawbacks of the prior-art piston construction mentioned briefly hereinabove and the features and advantages of a piston construction according to the present invention will be more clearly understood from the following description taken in conjunction with the accompanying drawings in which.

FURTHER DESCRIPTION OF THE PRIOR ART

Figure 1:
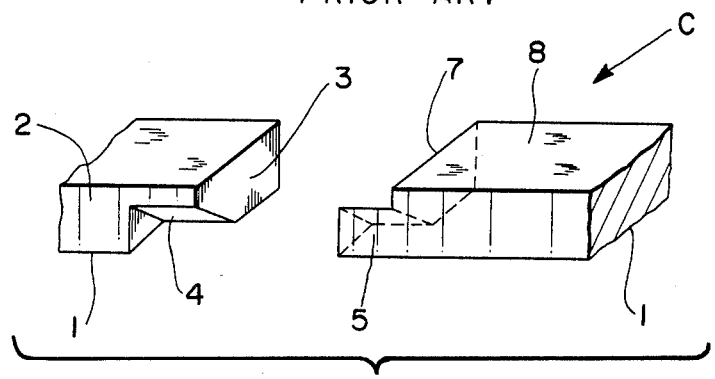
FIG. 1 is a perspective view showing the butt end portions of a double-angle ring employed in the prior-art piston for application to a reciprocating internal combustion engine.
Figure 2:
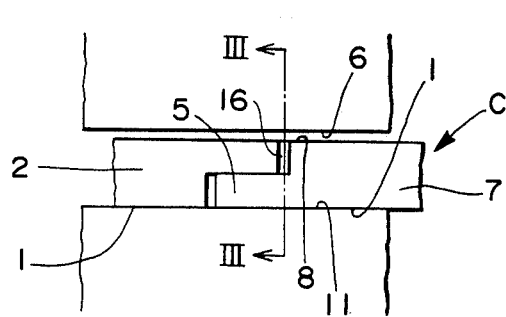
FIG. 2 is a partial front view showing the butt end portion of FIG. 1 when they are fitted together upon installation in an annular piston groove.
Figure 3:
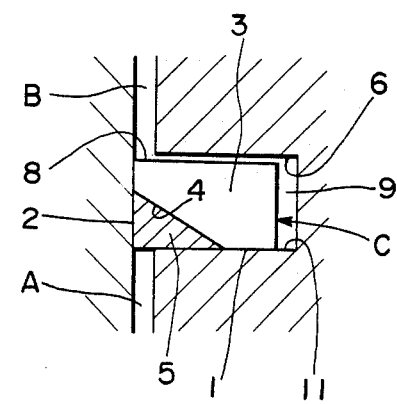
FIG. 3 is a partial side section of the prior-art piston with the double-angle ring of FIG. 1 installed in the annular groove thereof.

Referring to FIGS. 1, 2 and 3 of the drawings, a prior-art piston for use in a reciprocating internal combustion engine has a pressure ring C designed for improved gas tightness. The pressure ring C, the butt ends of which have a so-called double-angle construction, has a lower side wall 1 facing the low-pressure side A of a piston ring groove, an outer circumferential surface 2 which slidably contacts the inner circumferential wall of the cylinder, and a radially extending first butt flat end face 3. A corner portion formed on the lower side of the pressure ring C by the intersection of the lower side wall 1, outer circumferential surface 1 and end face 3 is partially cut away to form a notch 4 which is contiguous to the wall 1, surface 2 and end flat face 3. The pressure ring C further includes a radially extending second butt flat end face 7 opposing the first end face 3, and a rib 5 projecting circumferentially from the second end face 7 at a position corresponding to the notch 4, the rib 5 having a shape which is complementary to that of the notch 4 for being received by the notch when the pressure ring C is installed in an annular piston ring groove formed in the piston.

FIGS. 2 and 3 show the pressure ring C installed in the annular groove of a piston. It will be understood that high-pressure gas from the high-pressure side B between the piston and the cylinder wall flows into a cavity 9 at the back of the pressure ring C through a clearance 16 between the first and second butt end faces 3, 7, and through a clearance between upper side wall 8 of the pressure ring C and an upper side wall 6 of the piston ring groove. However, lower side wall 1 of the pressure ring C, namely the wall facing the low-pressure side A, is in intimate contact with lower side wall 11 of the piston ring groove, and the circumferentially extending rib 5 projecting from the second butt end face 7 is gas-tightly received in the notch 4 formed at the lower corner portion. As a result, the high-pressure gas which has flown into the cavity 9 at the back of the pressure ring C is impeded from flowing out to the low-pressure side A through the butt end faces of the ring, thereby providing excellent gas tightness.

Owing to the foregoing advantage, it has been contemplated to install the pressure ring having the above-described double-angle butt end structure in the piston ring groove of a piston for a reciprocating internal combustion engine in order to diminish blow-by.

Accordingly, a test, referred to hereinafter as Test II, was performed using the engine employed in Test I. In Test II, the piston used had a top ring and an oil ring without using a second ring, the top ring being the double-angle ring illustrated in FIGS. 1 and 2. The top ring was installed in the annular groove of the piston, as illustrated in FIG. 3. The oil ring was the conventional one. The experimental results in terms of oil consumption (gr/h) and blow-by (l/min) are as follows. Specifically, the values obtained were 50 gr/h, 5 l/min at 4600 rpm with a full engine load, 170 gr/h, 5 l/min at 5200 rpm with a full engine load, and 80 gr/h, 0 l/min at 2500 rpm with an engine high boost of 650 m/mHg. It will be appreciated that a reduction in blow-by is undoubtably achieved when the pressure ring having the double-angle butt end structure is installed in a piston in accordance with the usual method as described above and no second ring is used. On the other hand, however, no improvement is afforded in oil consumption. In fact, the values show that the tested piston configuration increases the consumption of oil to a marked extent.

The present invention contemplates an improved piston capable of diminishing oil consumption as well as blow-by.

DESCRIPTION OF THE PREFERRED EMBODIMENT

Figure 4:
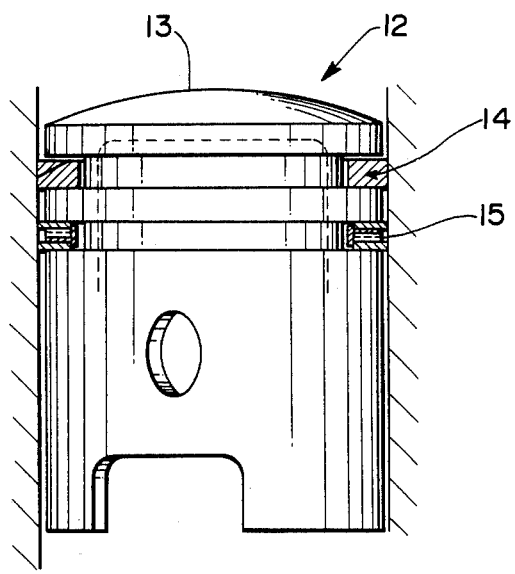
FIG. 4 is a side view, shown partially in section, of a piston embodying the present invention.
Figure 5:
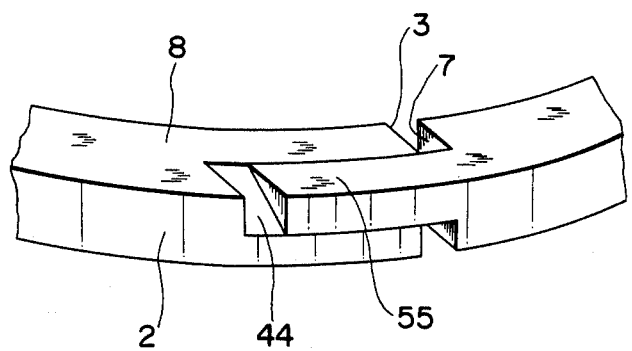
FIG. 5 is a partial perspective view showing a pressure ring used in the piston according to the present invention.
Figure 6:
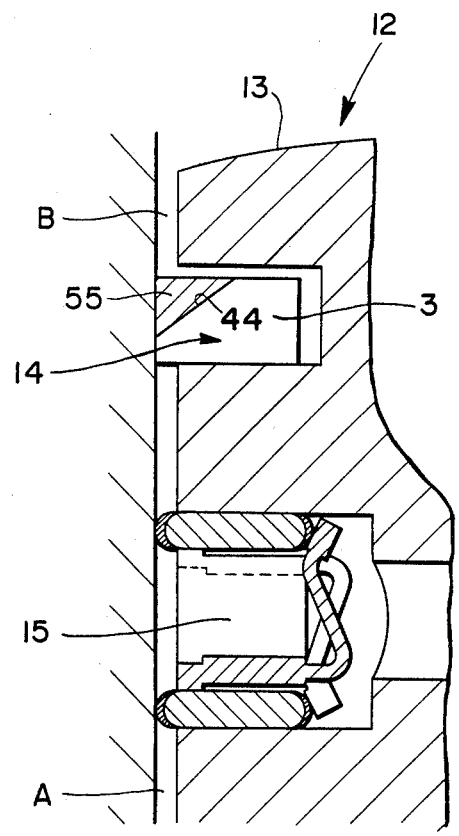
FIG. 6 is a partial side section of the piston shown in FIG. 4.

Reference will now be had to FIGS. 4 through 6 to describe a preferred embodiment of a piston according to the present invention. It should be noted that the second ring is not used.

The piston, having a main body 12 including a piston head 13, also includes a pressure ring 14 installed in an outer circumferential groove adjacent the piston head 13, and an oil ring 15 installed in an outer circumferential groove located below the groove accommodating the pressure ring 14. The pressure ring 14 has a double-angle butt end construction comprising the outer circumferential surface 2 slidably contacting the inner circumferential wall of the cylinder, the radially extending first butt flat end face 3, and the upper side wall 8 facing the combustion chamber side, namely the high-pressure side B, of the engine piston chamber. A corner portion formed on the upper side of the pressure ring 14 by the intersection of the outer circumferential surface 2, flat end face 3 and upper side wall 8 is partially cut away to form a notch 44 which is contiguous to the surface 2, flat end face 3 and wall 8. The pressure ring 14 further includes a radially extending second butt flat end face 7 opposing the first flat end face 3, and a rib 55 projecting circumferentially from the second flat end face 7 at a position corresponding to the notch 44, the rib 55 having a shape which is complementary to that of the notch 44 for being gas-tightly received by the notch when the pressure ring 14 is installed in the piston groove. The oil ring 15 can be of the well-known combined oil ring construction made of steel.

The piston having the above-described double-angle pressure ring 14 installed therein as shown in FIG. 6 was submitted to a test, referred to hereinafter as Test III, under the same conditions which prevailed in Test II. The experimental results in terms of oil consumption (gr/h) and blow-by (l/min) are as follows. Specifically, the values obtained were 0 gr/h, 10 l/min at 4600 rpm with a full engine load, 28 gr/h, 10 l/min at 5200 rpm with a full engine load, and 20 gr/h, 0 l/min at 2500 rpm with an engine high boost of 650 m/mHg.

If the results of Test III are compared with those of Test I, it will be seen that the arrangement of the present invention reduces oil consumption, and that the reduction is quite significant when a ghigh boost is applied. Blow-by also is reduced. And it should be noted that these effects are obtained regardless of the fact that a second ring is not employed. Comparing the results of Test III with those of Test II reveals that the piston of the present invention reduces oil consumption by a wide margin under each of the engine running conditions. Though there is a very slight increase in blow-by in comparision with Test II, the piston is well-suited for practical use, with none of the blow-by values exceeding those obtained in Test I.

Thus, the piston of the present invention as described and illustrated hereinabove reduces both blow-by and oil consumption in a reciprocating internal combustion engine, making it possible to improve engine efficiency.

As many apparently widely different embodiments of the present invention can be made without departing from the spirit and scope thereof, it is to be understood that the invention is not limited to the specific embodiments thereof except as defined in the appended claims.

What we claim is:

1. A piston for an internal combustion engine, comprising a piston main body having a piston head, only one pressure ring installed in a ring groove formed on an outer surface of said piston main body adjacent to the piston head, and only one oil ring installed in a ring groove formed on the outer surface of said piston main body below said pressure ring, said pressure ring having a double-angle butt end construction comprising an outer circumferential surface slidably contacting an inner surface of a cylinder bore, an upper surface facing a combustion chamber side of the engine, a radially extending first butt flat end face, said outer circumferential surface, the upper surface and said first butt flat end face defining a corner portion on a side of said pressure ring, only said corner portion being partially cut away to form a notch which is continguous to said outer circumferential surface, said upper surface and said first butt flat end face, said notch having a surface portion that extends downwardly from said upper surface to said outer circumferential surface, a radially extending second butt flat end face opposing said first butt flat end face, and a rib or projection projecting circumferentially from said second butt flat end face only at a position corresponding to said notch, said rib or projection having a shape which is complementary to that of said notch for gas-tight engagement with said notch.

* * * * *